United States Patent [19]

Pagani

[11] 4,344,221

[45] Aug. 17, 1982

[54] MACHINE TOOL WITH PORTABLE TOOL RECEIVING CARRIAGE

[75] Inventor: Giacomo Pagani, Piacenza, Italy

[73] Assignee: JOBS S.p.A., Italy

[21] Appl. No.: 165,752

[22] Filed: Jul. 3, 1980

[30] Foreign Application Priority Data

Feb. 29, 1980 [IT] Italy ................................ 20308 A/80

[51] Int. Cl.³ .......................... B23Q 3/157; B23B 3/36
[52] U.S. Cl. ...................................... 29/568; 82/34 R
[58] Field of Search ................... 82/34, 36 A; 29/568; 211/1.5

[56] References Cited

U.S. PATENT DOCUMENTS

| 2,901,927 | 9/1959 | Morgan | 29/568 X |
| 3,161,951 | 12/1964 | Anthony | 29/568 |
| 3,234,648 | 2/1966 | Knowles | 29/568 |
| 3,452,632 | 7/1969 | Brolund | 29/568 X |
| 3,546,774 | 12/1970 | Stoferle et al. | 29/568 |
| 3,650,018 | 3/1972 | Perry et al. | 29/568 |
| 4,038,739 | 8/1977 | Nobejl | 29/568 |
| 4,109,188 | 8/1978 | Shima et al. | 29/568 |

Primary Examiner—Harrison L. Hinson
Attorney, Agent, or Firm—McGlew and Tuttle

[57] ABSTRACT

A tool feeder for transferring a tool to a tool receiving device includes a base plate fixedly mounted adjacent to the receiving device and a carriage mounted on the base plate for selective alignment with the receiving device. The carriage is coupled and positionable relative to the base plate.

4 Claims, 9 Drawing Figures

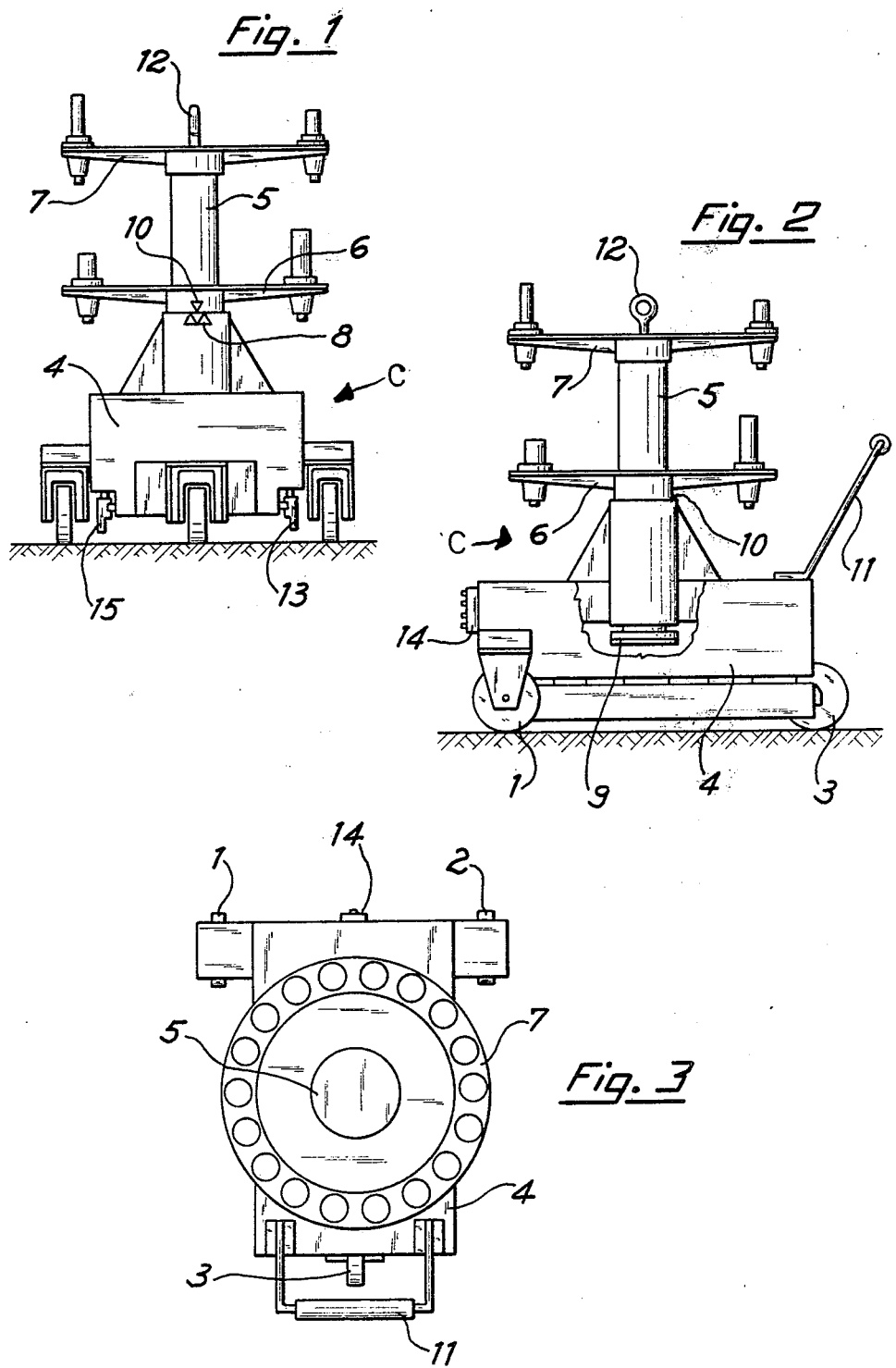

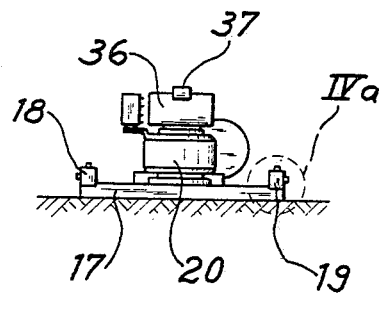
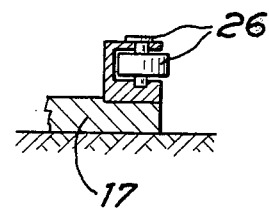
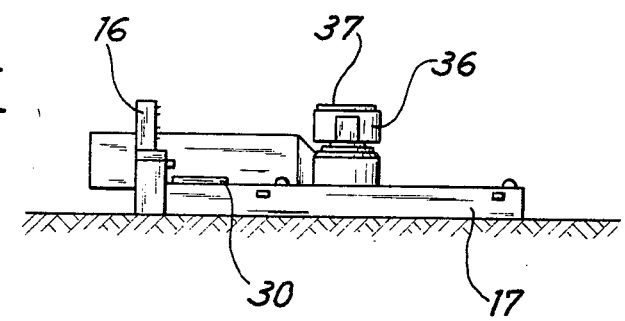
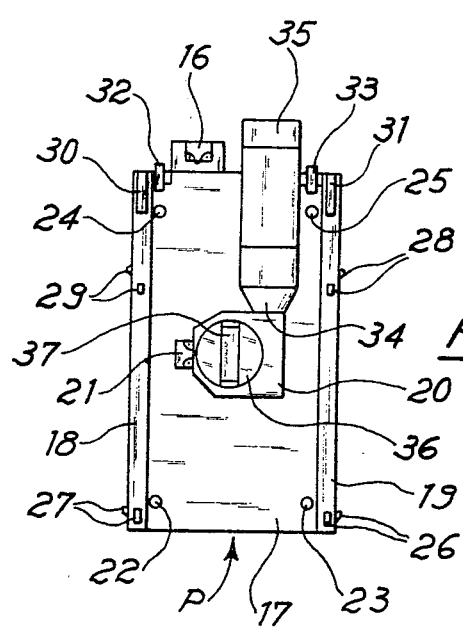

MACHINE TOOL WITH PORTABLE TOOL RECEIVING CARRIAGE

FIELD AND BACKGROUND OF THE INVENTION

The invention relates, in general to machine tools and more particularly to an apparatus for receiving a tool from a tool transferring device.

Modern machine tools possess advanced design features that provide an improved ratio between metal cutting time and total machine cycle time, due to automation which, however, now led to increased cost and reduced flexibility of such machines. This is especially true for the automatic tone changing operation on the normal metal cutting machine tools, that is, on milling machines, boring machines, boring mills, as well as on machining centers, with such terms usually being adapted to define machines capable of performing one or more of the aforementioned operations independently and automatically.

Generally, such metal cutting machine tools are presently provided with their own independent tool magazine having, of difficult accessibility for tool loading and unloading, and in which the tools themselves are located in unsuitable positions for a rapid inspection of the state of their cutting edges.

The time required for transferring the tools from a general magazine to a magazine fixed on the machine tool appreciably affects the machine's work cycle. The time required to transfer the tools from a general magazine to a typical carriage or a conveyor belt, and from the latter to a tool magazine fixed on the machine also appreciably affects the machine work cycle time. Moreover, such tool conveying operations can lead to errors and difficulties due to the different requirements of the individual machines, and the often complex arrangement of the tools in the magazine fixed on the machine, as well as due to an incorrect reading of the tool code number or to an erroneous prediction of the space available for the tool in the magazine.

SUMMARY OF THE INVENTION

In accordance with the invention, such defects are prevented by eliminating the fixed tool magazine on the machine and by replacing it with a tool feeder composed of a mobile tool carriage designed to serve any type of machine, as well as a series of machines, and of a platform anchored to the floor close to the machine, or between two machines located side by side, both carriage and platform being provided with coupling and positioning members.

The carriage preferably moves on three wheels, the front one of which swivels. A column, on the carriage supporting structure, is provided with various circular, concentric and horizontal discs or flat members, one atop the other, each rotating about its own axis, and each provided with a certain number of seats for the same number of tools.

The platform on which the carriage is located has means for angularly positioning the carriage due to a geared motor-pinion drive. The platform is also provided with an electronic resolver or encoder type decoding system, that is, angular pulse generators as an alternative to microswitches.

A lower central plate, integral with the disc carrier column of the carriage, is engaged by means of a key fitted to a cam-operated sleeve provided on the platform.

Side bottom guides on the carriage are designed, in turn, to mate with counter-guides on the platform. At least four pairs of perpendicular bearings serving to direct the carriage up to the anchoring blocks are mounted on the guides.

A series of trip dogs, located at the front of the carriage, are preset to trip relative microswitches in a microswitch box installed on the fixed platform. Hence, the carriage can be exactly located on the platform, as well as being fixed to the platform and having angular position adjustment.

The automatic tool changer member provided on the machine tool can, due to the inventive arrangement, always pick up the required tool without risk of error from the suitable tool holder disc of the aforesaid carriage.

Accordingly, it is an object of the invention to provide a tool feeder for metal cutting machine tools composed of mobile tool carriage and a fixed platform with both the carriage and platform being provided with positioning and coupling members.

It is an advantage of the invention, that the inventive arrangement permit accurate standarization of the operation of supplying new tools to the machine, thereby eliminating the necessity of having its own fixed tool magazine in the machine tool.

The tool feeder, according to invention, advantageously relieves all machine tools, no matter what type or origin, of the necessity of having an independent fixed tool magazine, which is supplied with tools one by one as the used tools are replaced. Hence, the machines cost less and are less complicated in design.

The inventive tool feeder advantageously permits programming and simultaneous performance of the various changes of tools, subject to an analogous degree of wear, in the various machines installed in a factory with the consequent simplification, rationalization and reduction in costs of such operations.

The inventive tool feeder advantageously permits trouble-free tool changing with no practical possibility of errors due to difficulty in maneuvering the machine operating heads to the fixed tool magazines, especially when the latter are located in positions not readily visible to the operator.

In accordance with a feature of the invention tool feeder having a mobile carriage whose base structure, preferably mounted on three wheels, upon which bears two or more spaced, horizontally disposed, rotating tool holder discs, one lying atop the other, i.e., vertically aligned, and also of a platform anchored to the floor at the side of the machine, are fitted to the carriage. Both the carriage and platform are provided with positioning and coupling members.

In accordance with another feature of the inventive tool feeder, the positioning and coupling members are mechanical, electric and electronic in nature, and are designed to ensure that the carriage can be exactly located, positioned and fixed on the platform, and turned relative to the latter by driving means associated therewith, towards the machine to be served. In accordance with still another feature of the tool feeder carriage locating means are provided in relation to the tools with which it is equipped. The locating means is composed of a series of adjustable trip dogs, located at the front of the carriage, which trip relative microswitches as required in a microswitch box located on the fixed platform. In accordance with even still another feature of the inventive tool feeder, the carriage positioning means incorporate a reference index on the tool holder disc column, as well as by the center swivelling wheel of the three wheels on which the carriage is preferably mounted. A further feature of the inventive tool feeder relates to the means for coupling the carriage to the fixed platform which is composed of a central lower plate on said column, into which can be engaged a key fitted to a cam-operated sleeve on the platform, and also composed of two lower side guides between the wheels designed to mate with two longitudinal counter-guides on the platform, in which are mounted at least four pairs of perpendicular bearings designed to direct the carriage towards the two anchoring blocks. Another feature of the inventive tool feeder comprises means for turning the tool carriage with respect to the mobile head of the machine's automatic tool changer, with said means consisting of a geared motor-sleeve assembly and an electronic resolver or encoder-type decoding system, that is to say, an angular pulse generator as alternative to the microswitches, with all these members being mounted on the platform.

These and other minor characteristics will appear clear from the description which follows and from the accompanying drawings.

The latter are to be considered as an exemplification with no limitation being intended, of a preferred embodiment of the tool feeder in accordance with the invention.

It is a further object of the invention to provide a tool feeder for transferring a tool to a tool receiving device which includes a base plate fixedly mounted adjacent to the receiving device, a carriage mounted on the base plate for selective alignment with the receiving device, means for movably coupling the carriage to the base plate and means for movably positioning the carriage relative to the base plate. In accordance with a preferred embodiment of the invention, the carriage includes a platform, a column vertically mounted to the platform, and a plurality of tool holder discs horizontally connected to the platform in a vertically spaced and aligned relationship.

It is a further object of the invention to provide a tool feeder which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 1 is a front elevation view of the carriage according to the invention,

FIG. 2 is a side view FIG. 1; and

FIG. 3 is a top view of the tool feeder according to the invention,

FIGS. 4,5,6 are the front, side and top views respectively of the fixed platform;

FIG. 4a is an enlarged detail from FIG. 4;

DESCRIPTION OF THE PREFERRED EMBODIMENT

Figure 7:
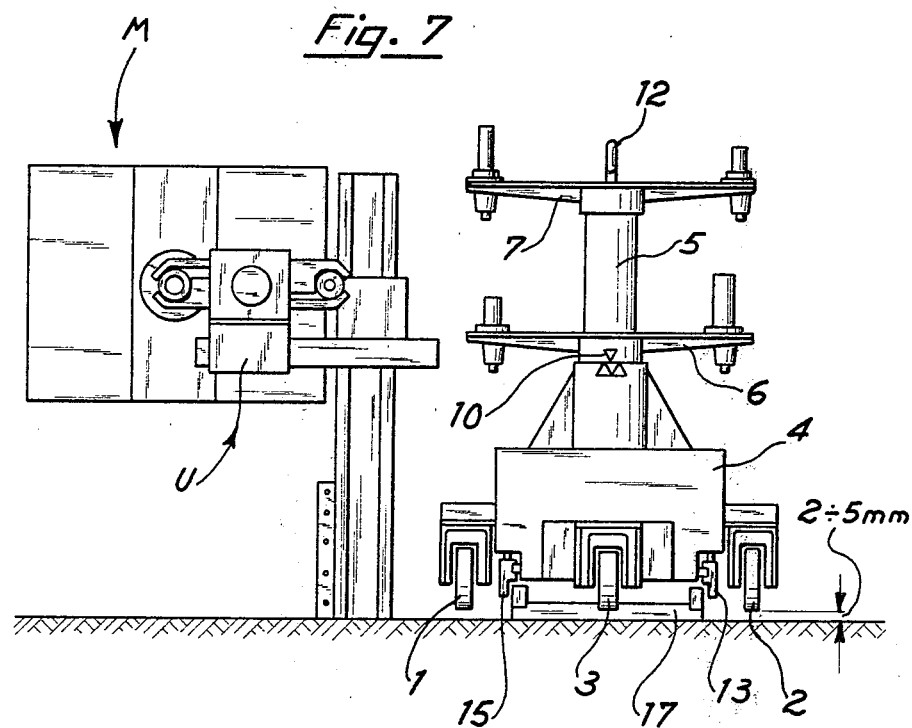
FIGS. 7 and 8 are the front and top views respectively of the tool feeder, according to the invention, with the carriage clamped to the fixed platform which is positioned at the side of the machine tool head in readiness for the automatic tool changing operation.

As can be seen from the drawings, the tool carriage (FIGS. 1,2 and 3) is mobile, and is preferably mounted on three wheels 1,2,3. The front wheel 3, is capable of swivelling. The tool carriage essentially comprises a base structure 4 bearing a vertical column 5 carrying, in turn, two (as illustrated in figure) or more spaced horizontally disposed tool holder discs 6,7.

Discs 6,7 are integral with column 5. Each disc 6,7 and is capable of rotating about its own axis.

Column 5 is mounted on and is guided by ball bearings in a circular path 8 (not shown in detail in FIG. 1).

Column 5 carries, in its lower portion, a plate 9 in which there is engaged a driving key 37 provided on fixed platform P (see FIG. 6), with which it can be exactly positioned by means suitable for the purpose and which will be described later on.

Column 5 is also provided (see FIG. 1) with a reference index 10 which is used for mounting carriage C on platform P through appropriate positioning of front wheel 3 and the two guides 13, 15 provided at the bottom of base structure 4.

The latter guides 13,15, which have a double F cross section, run and act on a pair of perpendicular bearings or rollers 26,27 and 28,29 which are mounted on counterguides 18-19 provided on platform P (see FIG. 6) until being anchored on anti-friction blocks 30,31.

Furthermore, at the rear of carriage C (FIGS. 2 and 3), a series of trip dogs 14 are provided which are appropriately adjusted to trip the microswitches in microswitch box 16 located in the corresponding position on platform P (see FIG. 6). Hence carriage C can be exactly located in relation to the tools to be supplied and consequently to the series of protruding trip dogs.

Carriage C (FIG. 2) is complete with a handle 11 to enable it to be pushed by hand, as well as with an eye-bolt 12 for lifting purposes. It is clear that this carriage C, besides being moved in the above manner, can also be moved automatically, being either motorized or designed to run on a magnetic track, such variants being obvious without departing from the scope of the invention.

Some of the parts of platform P have already been described above. As can be clearly seen from FIGS. 4,5,6, it essentially consists of a base plate 17 on the opposite sides of which are mounted elongated counter-guides 18,19, microswitch box 16, the pairs of bearings 26 to 29 and bearings 30,31 (which have already been mentioned above), and also comprises reduction gear 20 with relative sleeve 36 for driving the rotation movement, located at the center of base plate 17, a second decoding and presetting microswitch box 21, as well as a driving motor 34 and electronic angular positioning unit 35 (illustrated only schematically in the figure), preferably consisting of resolver or encoder, that is to say, angular pulse generators.

Angular position decoding of tool holder discs 6,7 is effected through microswitch box 21 and the cams (not shown) mounted on sleeve 36 to which is fitted the previously mentioned driving key 37.

Also in FIG. 6, designated with the numbers 22 to 25, are the tapped holes for levelling means through which platform P can be anchored to the floor exactly at the side of the machine tool/machine tools to be served;

lastly, the numbers 32,33 designate carriage C stop dogs provided with screw adjustment.

Figure 8:
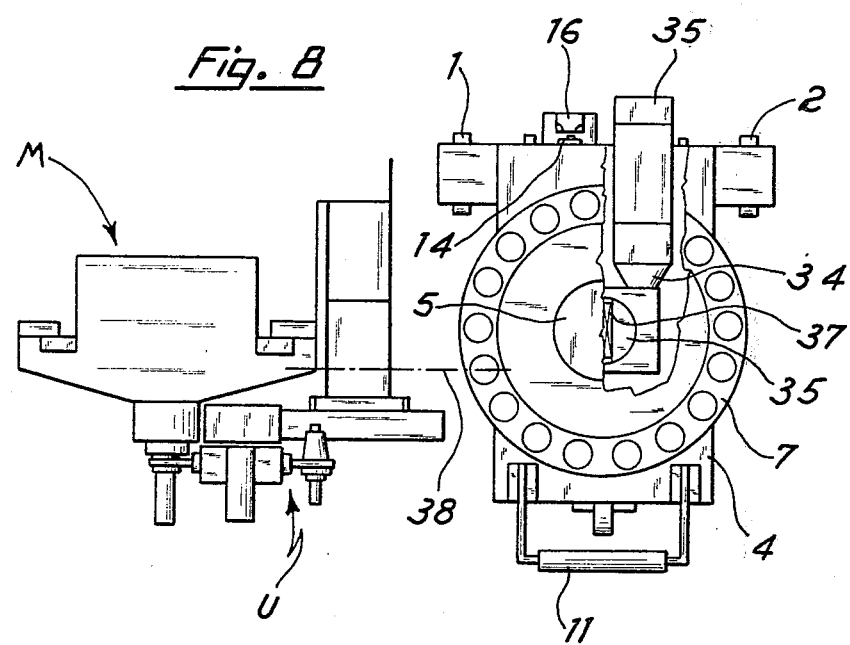

In FIGS. 7 and 8, the mobile tool carriage C is mounted on platform P. This assembly constitutes the tool feeder in accordance with the invention.

A diagrammatic representation of a machine tool head is shown alongside this tool feeder, which is provided with a familiar simple tool changer designated by the letter U.

A variation to such a solution is, however, predictable without departing from the scope of the invention in that the tool feeder can serve a robot or other equivalent apparatus instead the said automatic tool changer U. According to a preferred embodiment of the tool feeder exemplified in the figure, travelling wheels 1,2,3 of carriage C are raised above the floor by just 5 mm, but of course such a distance and other similar ones can be modified according to requirements.

Tool feeder operation will already appear obvious from the foregoing disclosure.

For a better understanding, by referring to FIGS. 7 and 8, it can be seen that once carriage C has been placed in an exact and repeatable position, both as regards height and sides, thanks to the already described means and once having located carriage C through the tripping of the microswitches 16 by trip dogs 14, it will then be possible for the automatic tool changer U (or a robot) first to advance, then rotate by 180°, followed by a movement back to a constant and presettable position 38 in readiness for the required tool pickup operation from disc 6 or 7.

The second microswitch box 21 provided on platform P serves to control the exact angular position of sleeve 36, or rather the position of key 37 mounted on the latter, with respect to plate 9 and to relative index 10 mounted on carriage C.

I claim:

1. An apparatus for receiving a tool from a tool transferring means comprising a platform mounted adjacent to the transferring means, a portable tool magazine carriage mounted on said platform for alignment with the platform, means for movably coupling said carriage to said platform, and means for movably positioning said carriage relative to said platform, and wherein said carriage comprises a base member, a column vertically mounted to said base member, and a plurality of tool discs horizontally connected to said column in a vertically spaced and aligned relationship; and wherein said coupling means comprises alongated counterguides fixed to opposite sides of said platform, guide members depending from said carriage adapted to engage said counterguides, a plate member connected to a lower portion of said column, a sleeve member mounted on said platform for rotation, and a key member connected to said sleeve member adapted to engage said plate member.

2. An apparatus for receiving a tool from a tool transferring means comprising a platform mounted adjacent to the transferring means, a portable tool magazine carriage mounted on said platform for alignment with the platform, means for movably coupling said carriage to said platform, and means for movably positioning said carriage relative to said platform; and wherein said coupling means comprises elongated counterguides fixed to opposite sides of said platform, guide member depending from said base member adapted to engage said counterguides, a plate member connected to a lower portion of said carriage, a sleeve member mounted on said platform for rotation, and a key member connected to said sleeve member adapted to engage said plate member.

3. A tool feeder as set forth in claim 1 or 2, further comprising sensing means connected to said base plate for locating said carriage, and trip means, connected to said carriage, operable to trip said sensing means responsive to the position of said carriage.

4. A tool feeder as set forth in claim 1 further comprising means for rotatably driving said sleeve and means for sensing and decoding the angular position of said column whereby the decoding of said tool holder discs angular position becomes possible.

* * * * *